United States Patent [19]

Darby

[11] 4,331,214

[45] May 25, 1982

[54] DEVICE TO REDUCE THE ACOUSTICAL RADIATION FROM EMPTY CANS AND CONTAINERS DURING HANDLING AND TRANSPORT IN CANNING AND RELATED OPERATIONS

[76] Inventor: Ronald A. Darby, 256 Kuulei Rd., Kailua, Hi. 96734

[21] Appl. No.: 62,869

[22] Filed: Aug. 1, 1979

Related U.S. Application Data

[63] Continuation of Ser. No. 706,829, Jul. 19, 1976, abandoned.

[51] Int. Cl.[3] .............................................. F16F 7/00

[52] U.S. Cl. .................................... 181/296; 181/208

[58] Field of Search ............... 181/207, 208, 200, 209, 181/296; 220/85 K, 356

[56] References Cited

U.S. PATENT DOCUMENTS

| | | | |
|---|---|---|---|
| 650,290 | 5/1900 | Wirk | 181/207 |
| 2,278,083 | 3/1942 | Lowe | 220/85 K |
| 3,104,681 | 9/1963 | Gray, Jr. | 220/356 |
| 3,876,034 | 4/1975 | Antonini | 181/208 |
| 3,963,226 | 6/1976 | Jankowski, Jr. | 220/85 K |
| 4,023,651 | 5/1977 | Healiss | 181/207 |
| 4,141,459 | 2/1979 | Eli, Jr. | 220/85 K |

*Primary Examiner*—L. T. Hix
*Assistant Examiner*—Benjamin R. Fuller
*Attorney, Agent, or Firm*—James C. Wray

[57] ABSTRACT

The acoustical radiation from handling empty cans and containers is reduced to sound levels which decrease the risk of hearing damage for exposed personnel by this invention. The invention comprises the temporary use of damping end-caps comprised of viscoelastic material which eliminates metal to metal contact between containers, guides, and cables and which also dissipates vibratory and airborne acoustical energy in the containers, thereby reducing the acoustical radiation.

The invention is applicable in particular to canneries and canning operations.

6 Claims, 6 Drawing Figures

DEVICE TO REDUCE THE ACOUSTICAL RADIATION FROM EMPTY CANS AND CONTAINERS DURING HANDLING AND TRANSPORT IN CANNING AND RELATED OPERATIONS

This is a continuation, of application Ser. No. 706,829, filed July 19, 1976 now abandoned.

BACKGROUND OF THE INVENTION

This invention relates to the field of acoustical noise control in the handling of cans and containers in canneries and associated operations.

This is a continuation of application Nos. 706,829, filed July 19, 1976, and 544,836, filed Jan. 28, 1975.

THE PROBLEM

Empty cans and containers are efficient acoustic radiators when vibrated or impacted as they are transported and handled in filling, canning, and associated operations.

The empty containers radiate noise when they impact each other and the guideways on gravity drops, turns, splits, switches, and other operations in transport and handling. The containers also radiate noise when excited by the transport cable particularly when there is relative motion between the containers and the transport cable, e.g. when the containers are stacked up in a guide way and the transport cable continues running. The sound pressure levels radiated from the containers are experienced by personnel working near such operations and often exceed accepted standards for hearing damage risk (reference 1).

Reference 1—"Section 1910.95, Occupational Noise Exposure", Occupational Safety and Health Administration, U.S. Department of Labor, Federal Register, Vol. 39, No. 207, Oct. 24, 1974

The amount of acoustic energy radiated from an individual container depends on the spectral and temporal characteristics as well as the magnitudes of the forcing function; (e.g., vibration or impact forces), the physical dimensions of the container, the method of support of the container, the type of material of which the container is composed, and the inherent vibration damping characteristic of the container.

The noise levels experienced by operators depend on the amount of acoustical energy radiated and the sound transmission loss between the source and the listener. The transmission loss depends on the distance to the operator, the existence of acoustical shielding, and the physical characteristics of the room. The problem is to reduce the radiated acoustic noise in order to reduce hearing damage risk among the exposed employees.

HOW SOLVED BEFORE

Typical solutions to reducing noise exposures to employees have been to shield or enclose the noise source so the noise is directed or contained away from the operator. Usually acoustically absorptive surfaces; (e.g., fiberglass mat, open cell foam, cellulose fibers, etc.) are placed on the noise source side of the shields or enclosures in order to absorb acoustical energy. However, these common noise control techniques are difficult to effectively implement when the noise sources are containers being handled and transported compared to situations when the noise sources are stationary machines or mechanical equipment used in the manufacturing processes. The major disadvantages of using shields and enclosures to reduce noise from cans or containers being handled or transported are:

a. A lack of access to the containers being transported or handled when manual adjustments or corrections are required.

b. The lack of visibility to the containers while in transport does not allow trouble areas to be seen and also negates the possibility of preempting jamming of the product flow.

c. The acoustical effectiveness of enclosures is severely compromised even when small openings exist in them, yet the cans or containers being handled must flow in and out the enclosures through openings at least as large as the cans or containers.

d. High initial costs may occur when large areas of shields or enclosures are involved.

When the interiors of acoustical enclosures and shields are lined with acoustically absorptive surfaces, the following additional problems may exist:

a. The possibility of contaminating the containers with the acoustical absorptive material exists. Such materials generally must be porous and may readily harbor bacteria or may release small pieces of the material when under continuous vibration due to fatigue of fibers or cells.

b. The absorptive surface cannot usually be washed and scrubbed routinely. Thin plastic films covering the absorptive surface may readily be ruptured and may not solve these problems.

Another typical solution is to provide operators with personal hearing protection such as ear plugs or ear muffs. These devices may cause discomfort, ear infection and/or loss of equilibrium and are not permitted by Federal law unless all reasonable engineering and administrative corrective actions are considered.

The application of acoustical absorptive material in the room will often reduce the sound pressure level in the reverberant noise field, but the noise levels for operators near the radiating containers are controlled by the direct sound transmission path and do not benefit from such corrective treatments.

Guideways and transport cables have been covered with plastic coatings in order to eliminate metal to metal contact between them and the containers. However, excessive acoustic radiation still exists from the empty containers because the containers themselves are not damped and remain efficient acoustic radiators even though the excitation forces are somewhat reduced by the plastic coatings.

SUMMARY OF THE INVENTION

Most of the solutions mentioned above deal with reducing the noise level that the operator experiences by increasing the sound transmission loss in the path between the noise source and the listener's ear. The new solution involves reducing the total radiated acoustical energy from the noise source itself (the cans or containers being handled) by temporarily attaching an end-cap which absorbs energy at contact and also increases the overall structural damping of the containers. The end-cap is composed of a viscoelastic material or a combination of viscoelastic material and other materials for structural and attachment purposes.

The airborne acoustical energy radiated from the containers is proportional to the spatially integrated vibrating motion of the surface of the container when excited by a forcing function. The new solution includes the temporary addition of an end-cap acting as a damping device which dissipates sufficient structural vibrating energy from the container to reduce the acoustical radiation.

Most empty containers comprised of metal sheet with major dimensions exceeding a few inches are inherently very lightly damped and are efficient acoustic radiators. In these instances a small amount of damping is very effective in reducing the vibration and the radiated acoustic levels. The end-caps are temporarily coupled to the container by elastic forces in the viscoelastic damping material of which they are comprised or additionally by internal springs or external mechanical clamping.

The end-caps may be manually or otherwise attached to the containers. Likewise, the end-caps may be manually or otherwise detached just before the containers are filled; after the containers are filled; and/or after the containers have passed through the noise sensitive area. The end-caps may be transported from the location where they were detached to the location where the end-caps are reattached to new containers incoming to the noise sensitive area.

DESCRIPTION OF THE PREFERRED EMBODIMENT

The type, size, number, and location(s) of end-cap damping devices which are to be temporarily attached to containers during filling, canning, handling and associated operations depend on the aforementioned parameters which determine the amount of acoustical energy radiated from the container as well as important non-acoustical considerations associated with the particular operation. For example, the inertial forces imposed on the end-cap by the motions experienced by the container in the operations must be overcome by the attachment method used to temporarily couple the end-cap to the container. In some operations the end-caps must also be capable of exposure to the temperatures, chemicals, and external forces that the container experiences in the operations. Furthermore, in some operations, the end-caps must not be capable of harboring harmful bacteria or other contaminants.

Figure 1:
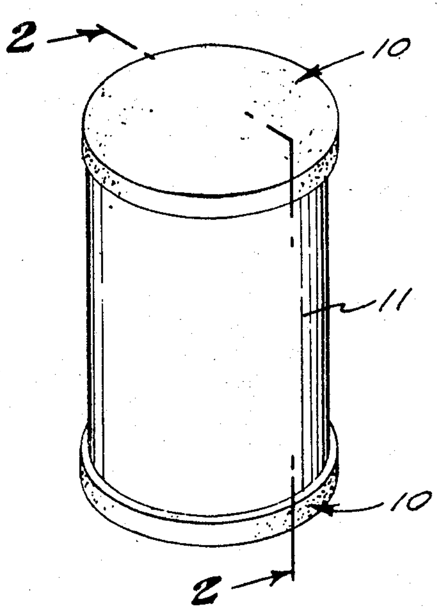
FIG. 1—is a perspective view of an empty container with damping end-caps on both the open and closed ends of the container.
Figure 2:
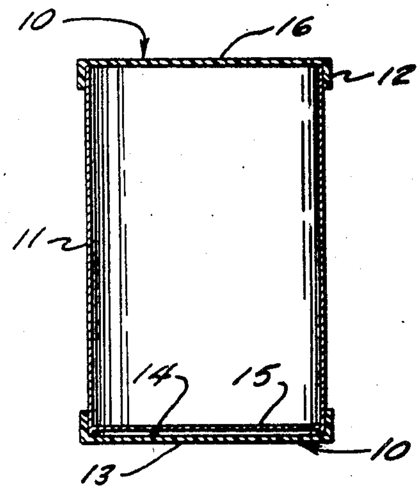
FIG. 2—is a cross-sectional view taken along line 2—2 in FIG. 1.

FIGS. 1 and 2 illustrate end-caps 10 solely comprised of a viscoelastic material secured to an empty container 11 by the elastic forces in the viscoelastic material. The lip 12 of the end-cap protrudes beyond any extremity of the container and largely precludes metal to metal contact between containers in guideways, thus reducing the radiated noise when the containers impact or vibrate against each other.

The relatively thin area 13 of the end-cap is closely acoustically coupled through enclosed air cavity 14 to the normally efficient acoustic radiating bottom area of the container 15. Appreciable vibratory energy of the container bottom 15 is transferred and dissipated in the viscoelastic material 13 even though physical contact does not take place. Thus, the most important noise source of most empty containers is effectively damped without the complications of adhesive or magnetic damping materials.

The thin area 16 of the end-cap on the top of the container effectively blocks, contains, and dissipates much of the airborne acoustical energy which would usually radiate out of the open top of the container.

Figure 3:
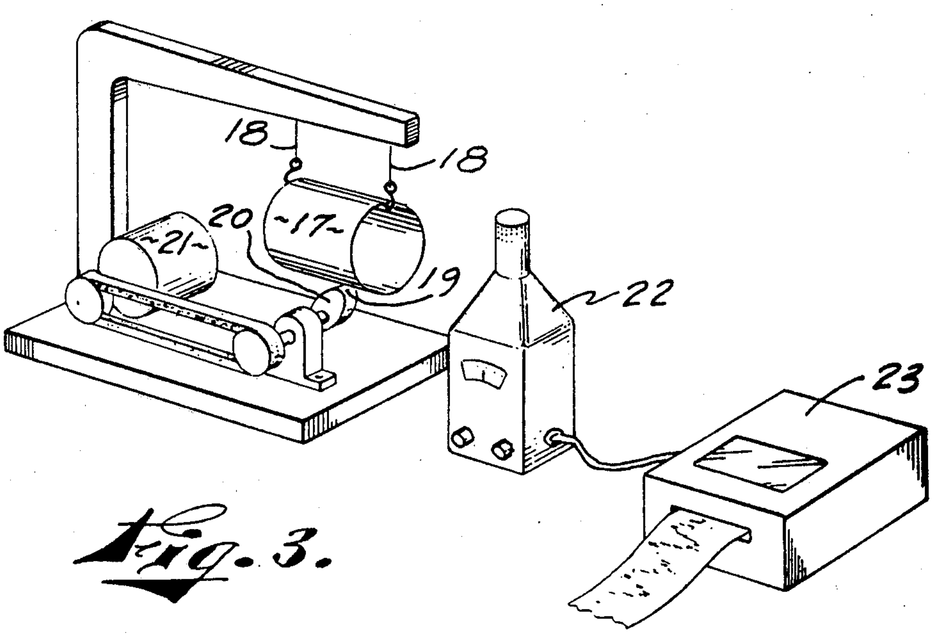
FIG. 3—is a longitudinal elevation view of a test apparatus used to determine the relative effectiveness of damping end-caps on containers.

The effectiveness of the damping end-caps in reducing the noise radiation from the container 17 in FIG. 3 suspended on light cord 18 and excited at point 19 by the eccentric 20 driven by motor and belt 21 has been determined by measuring the dBA sound level with the sound level meter 22 (located 18" from point 19) and recorder 23. The measured dBA levels are shown relative to the noisiest condition—that of exciting the bottom of the container without end-caps:

| | Container Excitation Point | |
|---|---|---|
| | Bottom | Side |
| No end-caps | 0 | −7dBA |
| Bottom end-cap only | −14dBA | −9dBA |
| Top end-cap only | −4dBA | −13dBA |
| Top and bottom end-cap | −14dBA | −14dBA |

The containers used in the above test were 4 inches in diameter and 5-7/16 inches high. The end-caps were commonly available polyethylene lids (often supplied with cans of products packed in high vacuum, e.g. coffee, nuts, etc.) and did not represent any optimum material or configuration for noise abatement. Choosing the optimum material for a damping end-cap to be used on a given container in a specific handling operation will involve such considerations as the damping qualities; the wear qualities; the static compliance; the density; and toxic and bacteria harboring qualities of the material.

Employees in a can plant or cannery are continuously exposed to noise caused by empty cans impacting upon each other in guideways. An example of the total noise attenuation that is possible by temporarily damping cans with end-caps follows:

Assume that an employee's location is such that N cans (impacting against each other or the guideways) are dominating the total sound pressure level ($SPL_T$) at his ears. Assume that a single can impact creates a sound pressure level of $SPL_O$ at 18 inches and the average distance from the can impact area to the listener is 36 inches. The equation to express $SPL_T$ is then:

$$SPL_T = SPL_O - TL + 10 \log N$$

where TL is the transmission loss due to spherical spreading. In this example, TL=6 dB. Let $SPL_O$=82 dBA and assume N=40, then:

$$SPL_T = 82 - 6 + 10 \log 40$$

$$SPL_T = 76 + 16 = 92\ dBA$$

If a single end-cap is placed on the end of each can and causes a noise attenuation (NA) of 5 dBA in radiated noise, the new $SPL_O'$ is:

$$SPL_O' = SPL - NA$$

$$SPL_O' = 82 - 5 = 77\ dBA$$

The new total level at the operator's ear would be:

$$SPL_T' = SPL_O' - TL + 10 \log N$$

or in this example:

$$SPL_T' = 77 - 6 + 16$$

$$SPL_T' = 87\ dBA$$

or a total reduction of 5 dB.

The main objective of the above simplified example is to show that the noise attenuation obtained from a single can impact may often be linearly subtracted from the total noise level caused by many can impacts.

Figure 4:
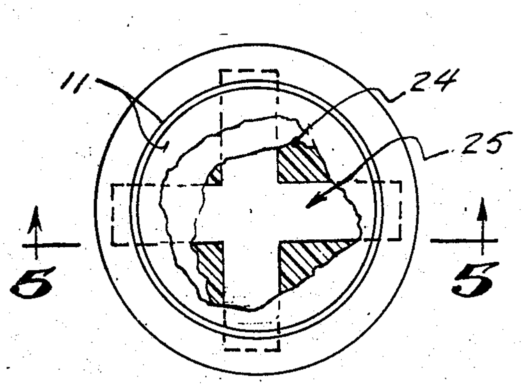
FIG. 4—is an end elevation view of a damping end-cap on a container showing an internal spring metal reinforcement member molded into the viscoelastic end-cap material.
Figure 5:
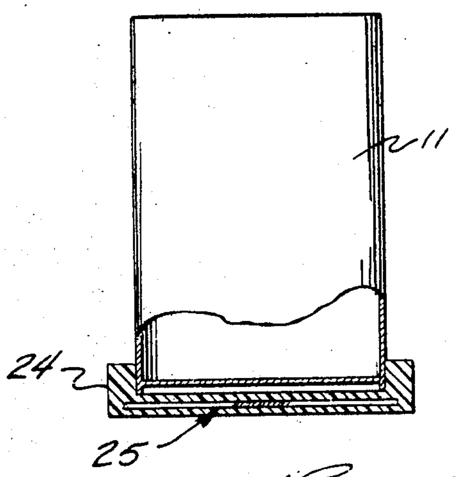
FIG. 5—is a cross-sectional view taken along line 5—5 in FIG. 4.

Thus, in many canneries where can impact noises cause noise levels just above the existing 90 dBA limit, the use of damping end-caps may readily lower the noise level such that compliance may be obtained. Also it should be noted that a 5 DBA reduction allows the permissible daily exposure time in reference 1 to be doubled. Another embodiment of the invention is a damping end-cap 24 as shown in FIG. 4 and FIG. 5 wherein an internal spring metal reinforcement member 25 is molded onto the viscoelastic end-cap to support the end-cap and hold it more tightly onto the container 11.

Figure 6:
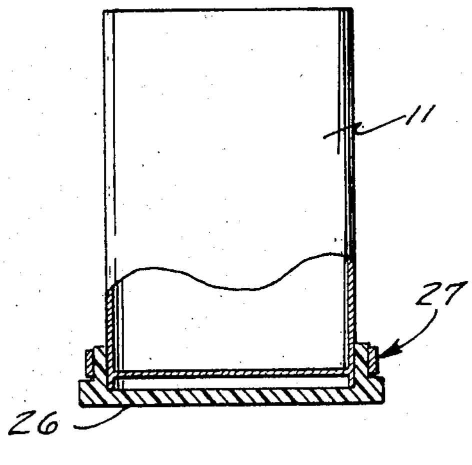
FIG. 6—is a cross-sectional view through a container with an end-cap held in place with an external metal band clamp.

FIG. 6 illustrates still another embodiment of the invention—a damping end-cap 26 that is secured with an external mechanical clamp or strap 27 in the area of the lip of the end-cap.

End-caps embodying both reinforcement members molded internally in the viscoelastic material and utilizing the external mechanical clamp may be desirable. Such end-caps are particularly adaptable to reducing the noise radiation from operations involving large empty containers, e.g. drums.

The acts of attaching and detaching the end-caps in the filling, canning, handling or associated operations involving empty containers depend only on the need for acoustical noise control; e.g. when personnel are exposed to excessive noise levels caused by radiation from the containers. Generally the presence of products in containers provides sufficient damping such that the acoustic radiation from the filled containers is not significant. Also filled containers are usually handled more gently than empty containers, thus the dynamic forcing functions are generally lower.

Although only a few embodiments of the present invention have been shown and described, it should be apparent that various changes and modifications can be made herein without departing from the scope of the appended claims.

What is claimed is:

1. A method of reducing the acoustical radiation from empty containers with a cylindrical wall and one end closed by a metal surface while the containers are being handled and transported comprising the steps of:

a. providing a damping end-cap comprised of a viscoelastic material and of a configuration such that the end-cap fits over the end of the container and is secured to the container by elastic forces in the viscoelastic material; and b. placing at least one said end-cap on the container by fitting a tip of the end-cap cover on end of the container and thereby forming an enclosed air cavity between a flat surface of the end-cap and a metal surface at a closed end of the container prior to entry of the container into a noise sensitive area; and abating noise by acoustically transferring vibratory energy in the metal surface at the closed end through the enclosed air cavity to the viscoelastic material in the end-cap; and c. removing the said end-cap from the container after the container has passed through the noise sensitive area, or after the container no longer radiates excessive noise; and d. transporting the removed end-cap so as to be available for use on another empty container which will enter the noise sensitive area.

2. The method of claim 1 including the step providing an internal spring metal reinforcement member molded into the said viscoelastic material of which the said damping end-cap is comprised.

3. The method of claim 1 including the step of providing an external mechanical clamp to secure the said end-cap to the container.

4. The method of claim 1 including the step of providing both an internal spring metal reinforcement member molded into the said viscoelastic material and an external mechanical clamp to secure the said end-cap to the container.

5. The method of claim 1 wherein the placing step comprises placing the end-cap on the container at the closed end thereof and the forming of the enclosed air cavity comprises forming an enclosed air cavity bounded by the metal surface, the flat surface and an outward extension of the cylindrical wall of the container.

6. The method of claim 5 where the placing further comprises placing a second end-cap on an open end of the container and forming an additional air cavity bounded by a flat surface of the second end-cap by the cylindrical wall and metal surface of the container.

* * * * *